(12) United States Patent
Riesterer et al.

(10) Patent No.: US 6,913,433 B2
(45) Date of Patent: Jul. 5, 2005

(54) DENESTING APPARATUS

(76) Inventors: Mark E. Riesterer, 20316 County Hwy. C, Valders, WI (US) 54245; Kurt M. Evenson, 305 S. Hwy. J, Cato, WI (US) 54230

(*) Notice: Subject to any disclaimer, the term of this patent is extended or adjusted under 35 U.S.C. 154(b) by 37 days.

(21) Appl. No.: 10/611,721

(22) Filed: Jul. 1, 2003

(65) Prior Publication Data

US 2005/0002773 A1 Jan. 6, 2005

(51) Int. Cl.⁷ ............................................. B65G 59/10
(52) U.S. Cl. ..................................... 414/795.6; 221/297
(58) Field of Search .......................... 414/788.2, 795.6, 414/797.7; 221/222, 297

(56) References Cited

U.S. PATENT DOCUMENTS

| | | | | |
|---|---|---|---|---|
| 1,095,319 A | * | 5/1914 | Erwin | 221/23 |
| 1,634,566 A | * | 7/1927 | Wessman | 221/222 |
| 1,654,004 A | * | 12/1927 | Lind | 141/105 |
| 1,662,593 A | | 3/1928 | Wessman | |
| 1,667,483 A | * | 4/1928 | Leof | 221/96 |
| 3,098,585 A | * | 7/1963 | Giepen | 221/116 |
| 3,323,680 A | * | 6/1967 | Beer | 221/221 |
| 3,420,407 A | * | 1/1969 | Christine et al. | 221/221 |
| 3,455,484 A | * | 7/1969 | Edwards | 221/222 |
| 3,862,702 A | | 1/1975 | Johnson et al. | |
| 4,048,915 A | | 9/1977 | Martin | |
| 4,418,837 A | | 12/1983 | Kontz | |
| 4,867,632 A | | 9/1989 | Provan et al. | |
| 4,943,207 A | | 7/1990 | Provan et al. | |
| 4,961,684 A | | 10/1990 | Provan et al. | |
| 5,024,048 A | | 6/1991 | Moore | |
| 5,067,308 A | | 11/1991 | Ward | |
| 5,738,246 A | | 4/1998 | Chung | |
| 5,931,341 A | | 8/1999 | Bittermann | |

* cited by examiner

*Primary Examiner*—Richard Ridley
(74) *Attorney, Agent, or Firm*—Andrus, Sceales, Starke & Sawall, LLP (57) ABSTRACT

A denesting apparatus for a stack of cup-shaped articles having peripheral outwardly extending rims includes a pair of uniquely machined rotary shafts which operate together to support the stack of nested articles and to denest and separate one article at a time as the stack passes vertically downwardly between the shafts. Each of the shafts includes at least one profiled surface portion which makes line contact with the lowermost cup rim and supports the stack, followed rotationally by a groove that engages the rim of the lowermost cup to denest and separate it from the stack.

20 Claims, 10 Drawing Sheets

DENESTING APPARATUS

FIELD OF THE INVENTION

Background of the Invention

The present invention relates to an apparatus for denesting articles from a stack. Specifically, the present invention relates to an apparatus for denesting articles having spaced apart peripheral outwardly extending rims when nested.

In individual processes such as the manufacture of articles such as cups, containers or the like, quick, reliable and inexpensive dispensing and alignment of individual articles from a nested stack of articles is a common necessity. Several attempts have been made in the art to accommodate the need for such dispensing means. For example, Beer U.S. Pat. No. 3,323,680 discloses a device for separating cups from a stack of nested cups. The device clamps every cup in the stack except the bottom cup to be denested. A resilient band twists the walls of the lowermost cup in order to free it from the stack and move it away from the stack. The device includes air means for aiding and conveying the article away from the stack.

Erwin U.S. Pat. No. 1,095,319 discloses a machine for dispensing a lower most paper cup from a stack of nested paper cups. The device includes a series of wheels 14 having teeth which engage the lip of a lower most cup in the stack. Rotation of the wheels causes the teeth to engage the lip and denest the lower most cup.

Wessman U.S. Pat. No. 1,634,566 discloses a cup dispenser having rotary worm members provided with thread turns spaced to correspond to the spacing of flanges on the cups when nested. Rotation of the worm members engages the flange of a lower most cup and denests it from the stack.

Ward U.S. Pat. No. 5,067,308 discloses an apparatus for supporting and dispensing a nested stack of containers. First and second pairs of support place plates are spaced apart and moveable between supporting and released positions to free a lowermost container in the stack of containers. A pair of thrusting fingers exert a downward force on the released container to deliver it to an awaiting transport receptacle.

Moore U.S. Pat. No. 5,024,048 discloses an apparatus for dispensing individual containers from a stack of nested containers. An extendable arm holds the stack of containers in an elevated position. A second extendable arm wedges the stack of containers, with the exception of the bottom container of the stack, against the side of a column. A third extendable arm contacts the bottom container in the stack causing the bottom container to separate from the stack.

As manufacturing processes develop, there is a continued need for a device that automatically denests and accurately places trays, lids, cups or any articles that possess uniform stacking features in a quick and efficient manner. It is therefore desirable to provide an apparatus for dispensing such items that comprises minimal number of parts and operates efficiently with little chance for mechanical breakdown. It is further desirable to provide an apparatus for denesting such items that is low cost and may be efficiently manufactured and installed.

SUMMARY OF THE INVENTION

The denesting apparatus of the present invention utilizes a pair of uniquely machined rotary members or shafts which operate together to support a stack of nested articles, such as cups, and to denest and separate one cup at a time as the stack passes vertically downward between the shafts. The elongated rotary member or shaft operates to denest articles that are spaced apart and have peripheral outwardly extending rims in a nested stack. Each of the rotary members includes at least one profile which is sized and shaped to support the stack of nested articles by engaging the rim of the lowermost article in the stack as the rotary member rotates about its longitudinal axis, and at least one groove that is formed in the profile, which groove is sized and shaped to receive the rim of the lowermost article in the stack in response to rotation of the member and to denest the lowermost article from the stack. In the preferred embodiment, the groove includes a first face for receiving the rim of the lowermost article and a second face for engaging the rim to denest the article from the stack. The apparatus includes a drive that provides counterrotating motion to the pair of rotary members and maintains the grooves in synchronization at the point of denesting.

In a particularly preferred embodiment, the invention pertains to an apparatus for denesting cup-shaped articles having peripheral outwardly extending rims, the rims spaced apart when the articles are in a nested stack, the denesting apparatus comprising: a pair of laterally spaced counterrotatable shafts each having a profiled surface portion that is sized and shaped to receive the stack therebetween, to at least partially surround the lowermost article in the stack and to support the stack by engaging the rim of the lowermost article, and a groove formed in each profile surface, the grooves sized and shaped to receive and engage the rim of the lowermost article in response to counterrotation of said shafts and to denest and separate the lowermost article from the stack. The apparatus also includes a drive for providing the shaft counterrotation and for maintaining the grooves in synchronization at the position of denesting and separation. Preferably, each shaft includes a plurality of grooves circumferentially spaced around the profiled surface, and the drive is operative to provide unidirectional rotation of the shafts.

In an alternate embodiment, the counterrotatable shafts may be provided with a single groove and the drive operated to provide reciprocal rotation of the shafts.

In a presently preferred embodiment, each of the grooves has a generally V-shaped cross-section defined by a leading face and a trailing face, the leading face adapted to receive the rim of said lowermost article and the trailing face adapted to engage the rim for separation. Each groove is preferably formed such that the leading and trailing faces intersect along a curved separating line, and a plane containing said separating line lies parallel to and offset above the axis of rotation when the rim of the article is engaged in the groove.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
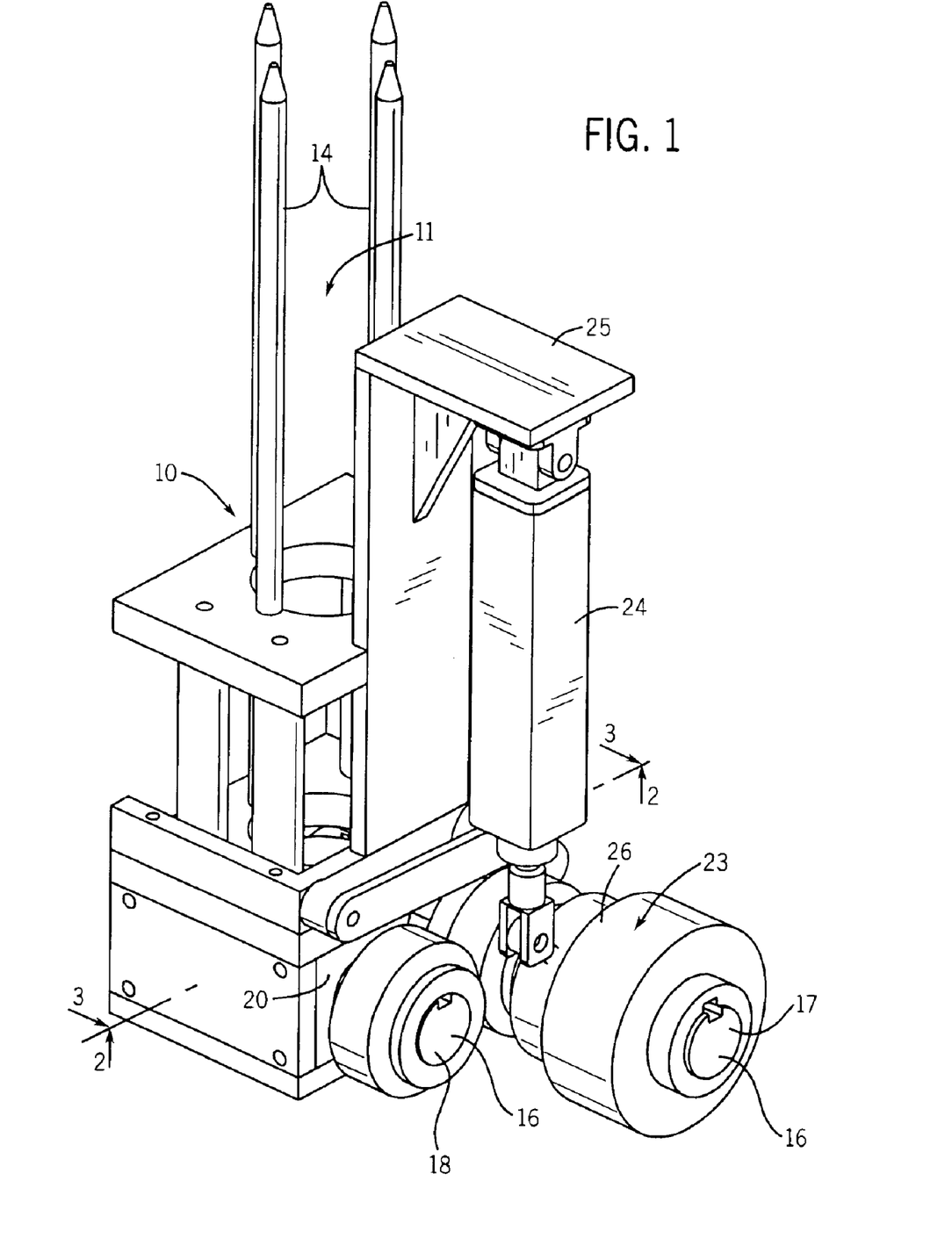
FIG. 1 is a perspective view of the denesting apparatus of the present invention.
Figures 2, 3:
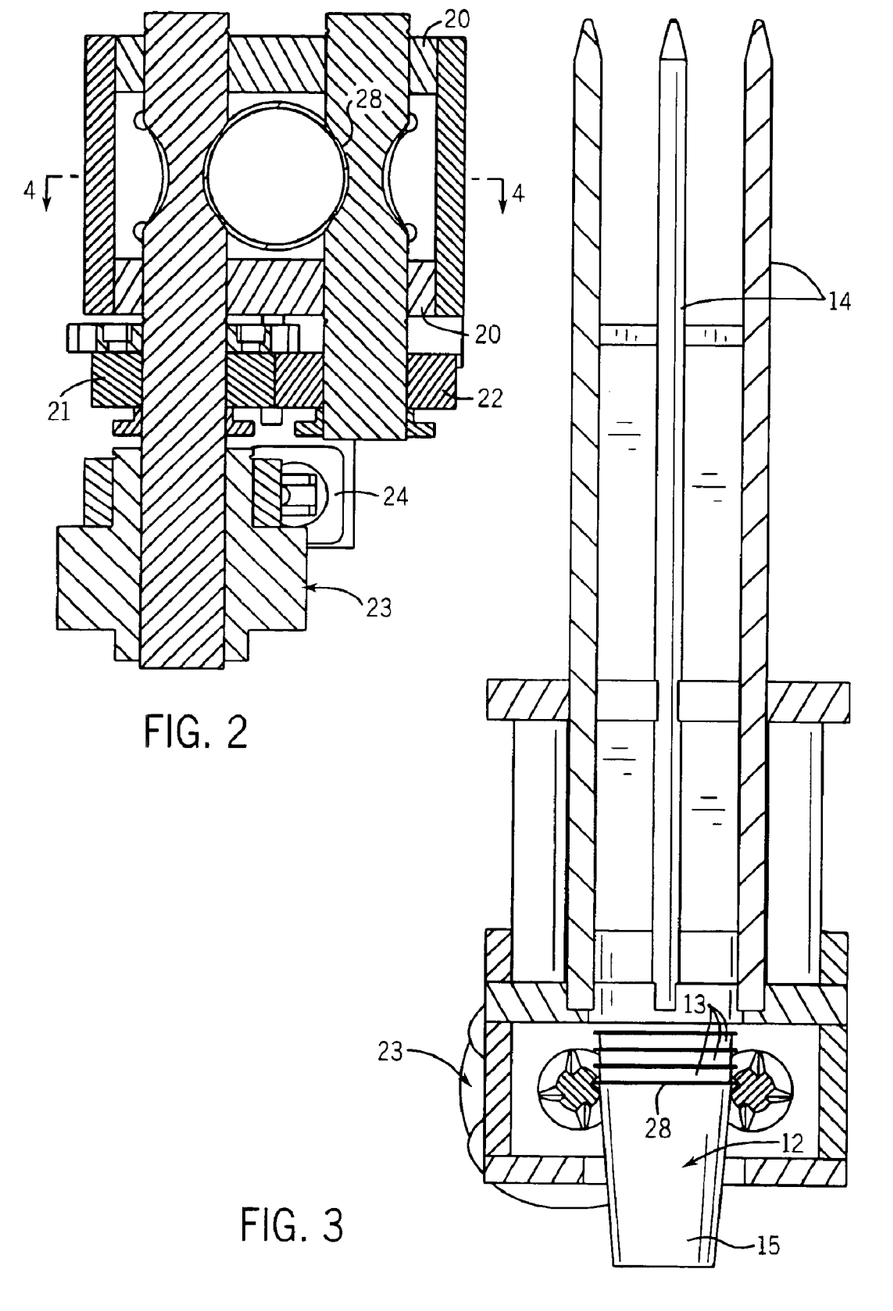
FIG. 2 is a horizontal sectional view taken on line 2—2 of FIG. 1.
FIG. 3 is a vertical sectional view taken on line 3—3 of FIG. 1.

Referring initially to FIGS. 1–3, there is shown a single-station denesting apparatus 10 of the present invention. The apparatus includes an upper feed section 11 to provide lateral support for a nested stack 12 of cups 13, only the last four cups 13 of the stack being shown in FIG. 3. The feed section 11 includes four vertically extending guide rods 14 to provide generally vertical alignment to full height stack 12 being denested by the apparatus 10. The nested stack 12 is supported by and the bottom cup 15 of the nested stack is sequentially denested and separated from the remaining stack above it by a pair of counterrotating shafts 16 between which the stack 12 of cups passes with one cup at a time being separated therefrom for serial downstream processing, such as filling with a food product.

In the embodiment shown, the denesting apparatus 10 includes a longer drive shaft 17 and a shorter driven shaft 18. The shafts 17 and 18 are suitably journaled in support blocks 20 which are preferably made of UHMW polyethylene and form part of the main frame of the apparatus. The support blocks 20 are interconnected with side plates 19. The shafts 17 and 18 are provided, respectively, with a drive gear 21 and driven gear 22 which are matched and interengaged to provide synchronized counterrotation of the shafts 16. A drive mechanism 23 is operatively connected to the drive shaft 17 to drive the shafts 17 and 18. As best seen in FIG. 1, the drive includes a pneumatic cylinder 24 operating between an upper mounting plate 25 and a lower escapement mechanism, such as an overrunning clutch 26, to provide unidirectional counterrotation to the shafts 17 and 18. It should be noted and as will be described in greater detail hereinafter, the shafts 16 may also be driven to provide reciprocal rotation in a manner in which the cups are denested in the same way as the preferred embodiment.

Figure 4:
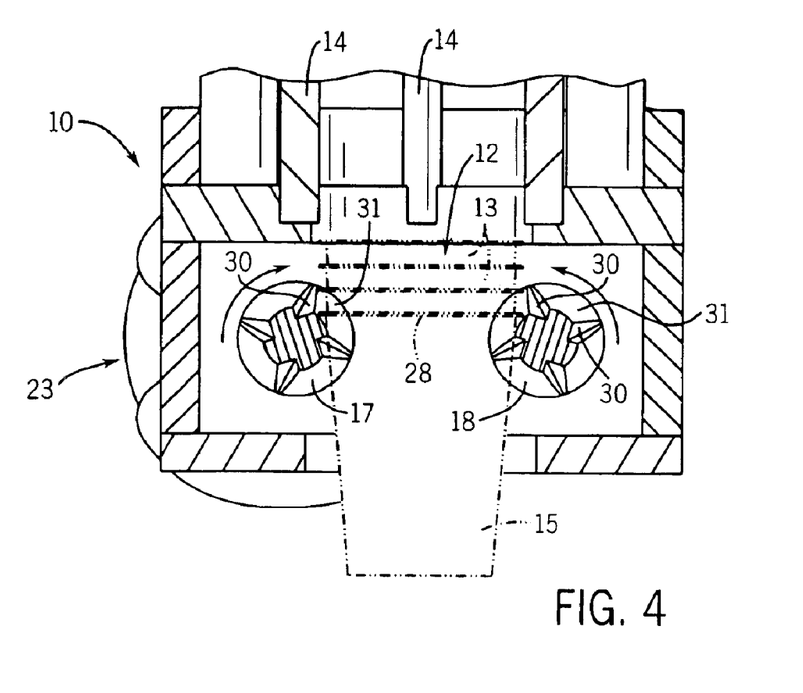
FIGS. 4–6 are similar vertical sections taken on line 4—4 of FIG. 2 showing the denesting and separation of a single cup.
Figure 6:
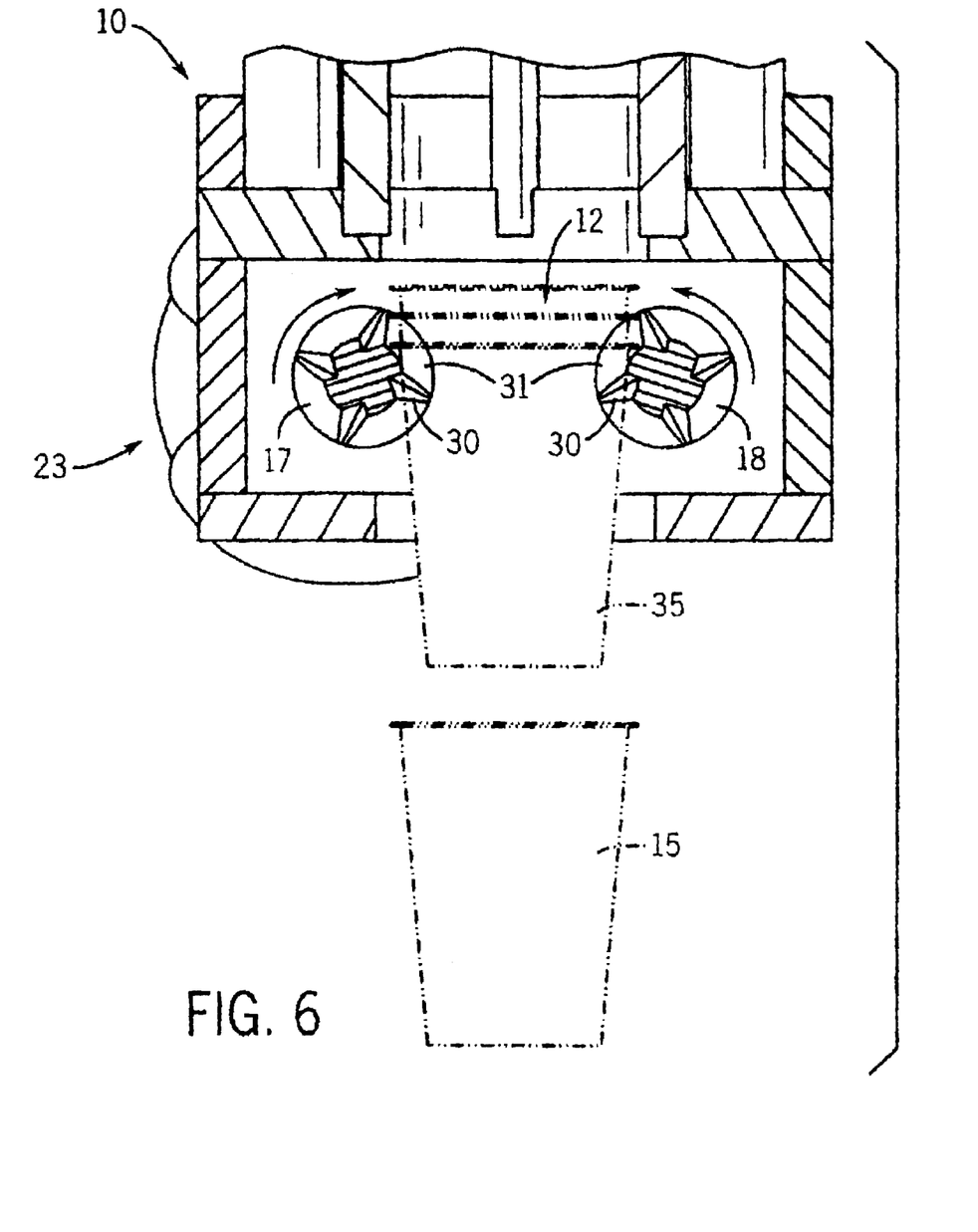
Figure 7:
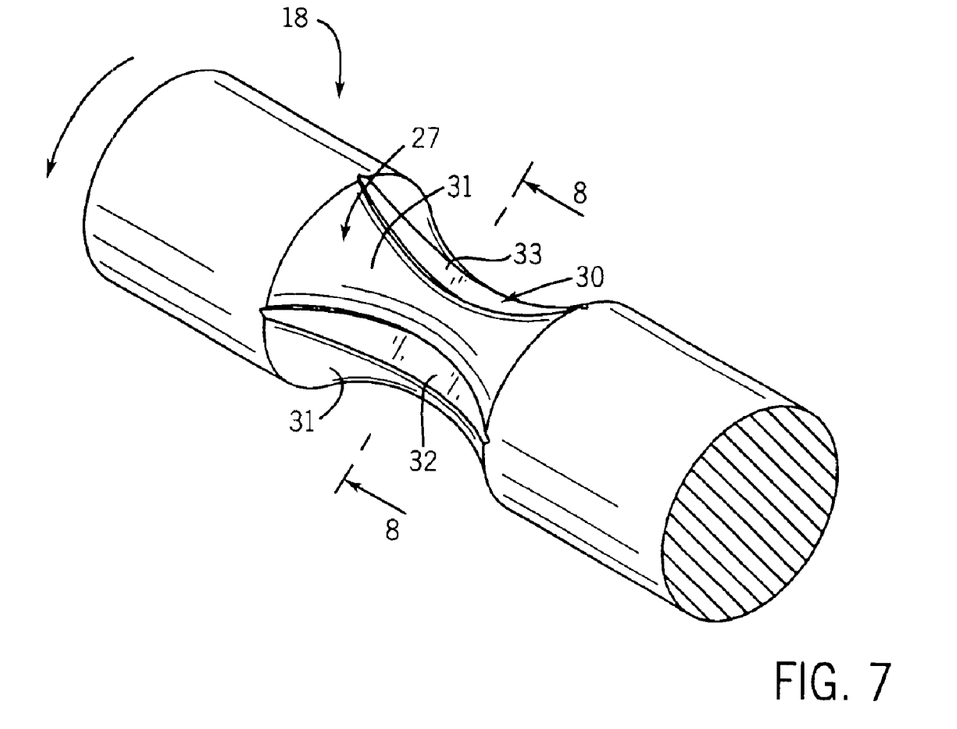
FIG. 7 is a perspective view of the presently preferred embodiment of one of the rotary shafts used in the denesting apparatus.
Figure 8:
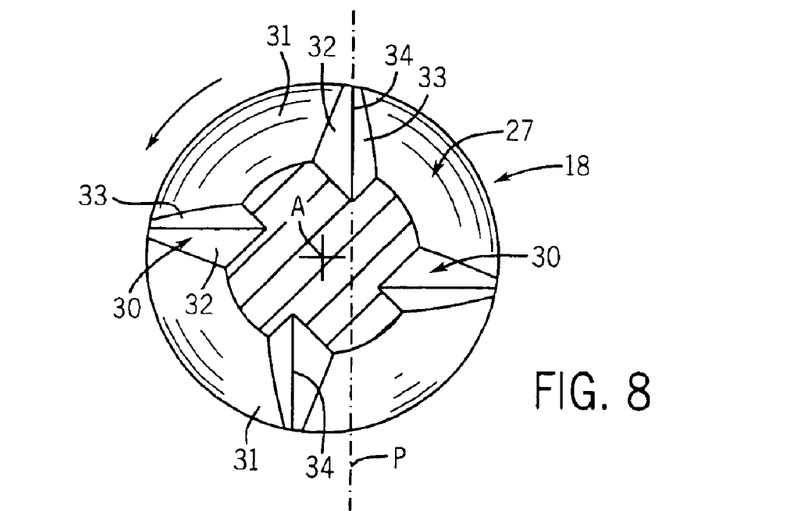
FIG. 8 is a sectional view taken on line 8—8 of FIG. 7.

Referring also to FIGS. 7 and 8, and specifically the driven shaft 18 shown in FIG. 7, each of the shafts 16, is machined to provide a unique geometry that permits the shaft pair 16 to be operated simultaneously and in synchronous counterrotation to support the stack 12 of cups 13 and to reliably denest and separate the bottom cup 15. The unique profiled surface and groove construction of driven shaft 18 in FIG. 7 is identical to construction of the drive shaft 17. In a machined cylindrical shaft 18, a profiled surface 27 is machined that is sized and shaped such that when it is mounted in relation to the identically machined drive shaft 17, the bottom cup 15 in the stack 12 will be supported with its outwardly extending peripheral rim 28 in contact with the profiled surface 27 above the horizontal rotational axes of the shafts 17 and 18. This is best seen in FIG. 4. Each of the shafts 17 and 18 is also provided with a plurality of grooves 30 which are machined in the profiled surface 27 and circumferentially spaced around the profiled surface. In the preferred embodiment shown in FIGS. 1–8, there are four equally spaced grooves 30 in each of the shafts 17 and 18. The grooves 30 effectively separate the profiled surface 27 into four equally spaced profiled surface portions 31.

Figure 5:
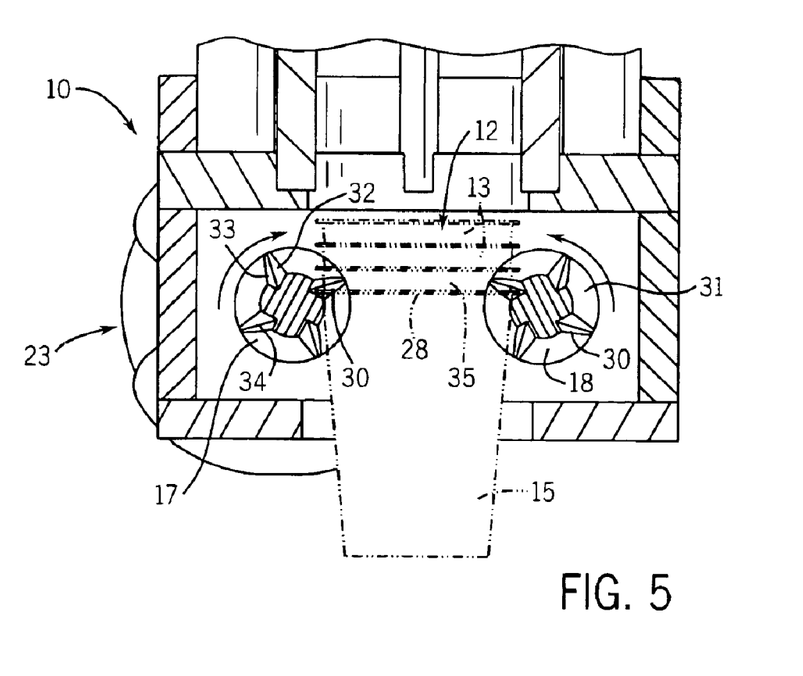

Each of the grooves 30 has a generally V-shaped cross-section and extends in a generally axial direction of the shaft along the full length of the profiled surface 27. As best seen in FIG. 7, the grooves 30 are essentially crescent-shaped. Each of the grooves is defined by a leading face 32 and a trailing face 33 with respect to the direction of shaft rotation as shown by the arrows in FIGS. 7 and 8. In addition, the grooves 30 are machined off-center with respect to the axis A of the shaft 17 or 18 such that the leading and trailing faces 32 and 33 intersect in a curved separating line 34 that lies in a plane P which is offset from the axis of rotation of the shafts, as shown in FIG. 8. Furthermore, with the shafts oriented to rotate in the direction indicated by the arrows in FIGS. 7 and 8, as well as FIGS. 4–6, the rim 28 of the bottom cup 15 supported on the profiled surface portions 31 will, with continued rotation of the shafts, be initially received on the leading face 32 of the groove as seen in FIG. 5. As rotation of the shafts continues, the rim 15 will be positively engaged by the trailing face 33 causing the bottom cup 15 to be denested and separated from the remaining stack 12 above. The groove 30 is properly sized with respect to the spacing of the rims of the cups in the stack such that the rim of the following cup 35 is engaged and supported by the surface portions 31 which immediately follow the grooves 30 that have discharged the bottom cup 15, as best seen in FIG. 6.

The shafts 17 and 18 of the preferred embodiment are provided with four circumferentially spaced grooves 30. However, the apparatus can be made with any number of grooves, including a single groove, so long as the circumferential spacing of the grooves around the shaft provides an adequate profiled surface portion 31 between the grooves to partially surround the upper portion of the cup and support the cup rim 28 on the surface portion. Referring again to FIG. 4, the rim 28 of the lowermost cup 15 in the stack rests on the profiled surface portion 31 above a plane through the horizontal centerlines of the shafts 17 and 18. Because of the compound curvature of the profiled surface portions 31, the line of contact between the outer edge of the cup rim 28 and the profiled surface portions 31 in the plane of the rim is a circular line having a radius approximately equal to the outside radius of the rim. Thus, and as may be best seen in FIG. 2, the rim of the cup is supported on each profiled surface portion 31 along a line subtending an arc of about 90°, thereby providing approximately 180° of supporting contact between the cup rim 28 and the two shafts 17 and 18.

It may be desirable to form the grooves 30 in the shafts with other than a V-shaped cross section. For example, if the product being denested has a thick (e.g. square cross section) rim that needs more clearance, cutting a V-shaped groove to accommodate a thick rim might result in machining too deeply into the shaft such that it would adversely affect shaft integrity. In such a case, a square or U-shaped groove could be used to accommodate a thick rim without having to machine too deeply into the shaft.

Figure 9:
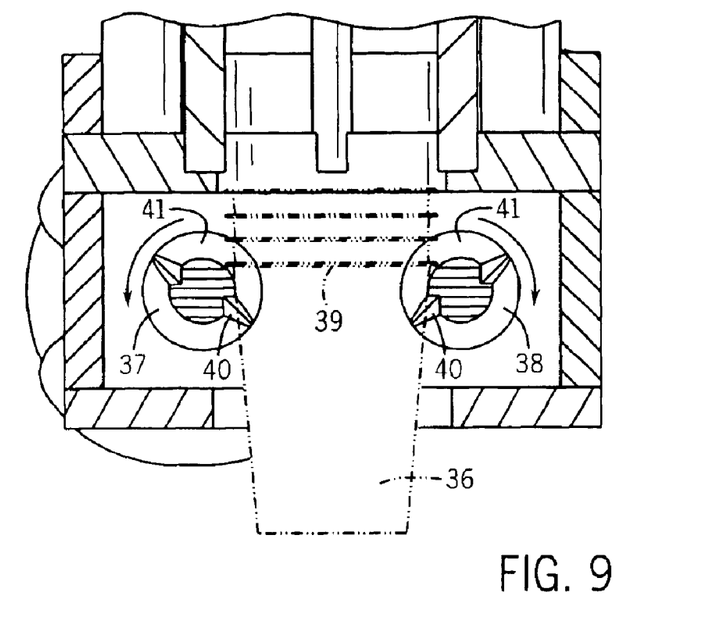
FIGS. 9–11 are vertical sectional views similar to FIGS. 4–6 showing a variation in the construction of the rotary denesting shafts and in the manner in which the shafts are driven.
Figure 10:
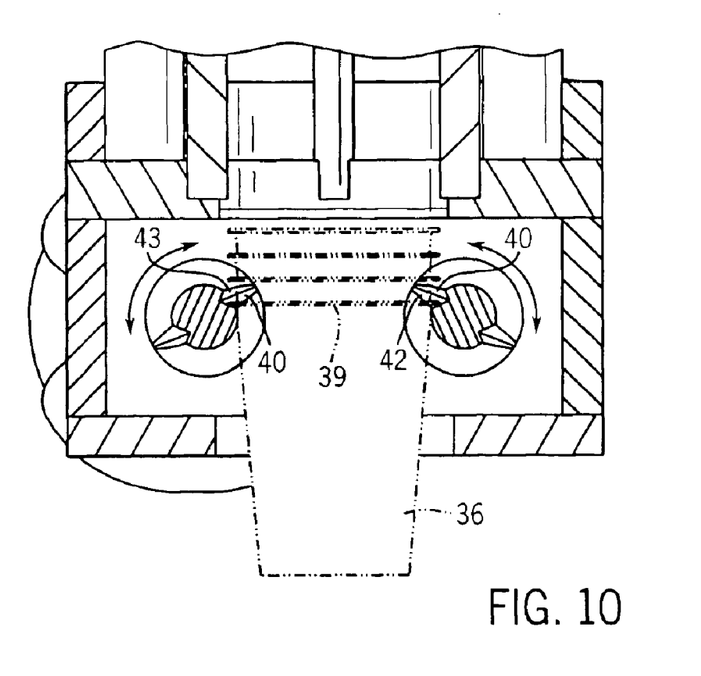
Figure 11:
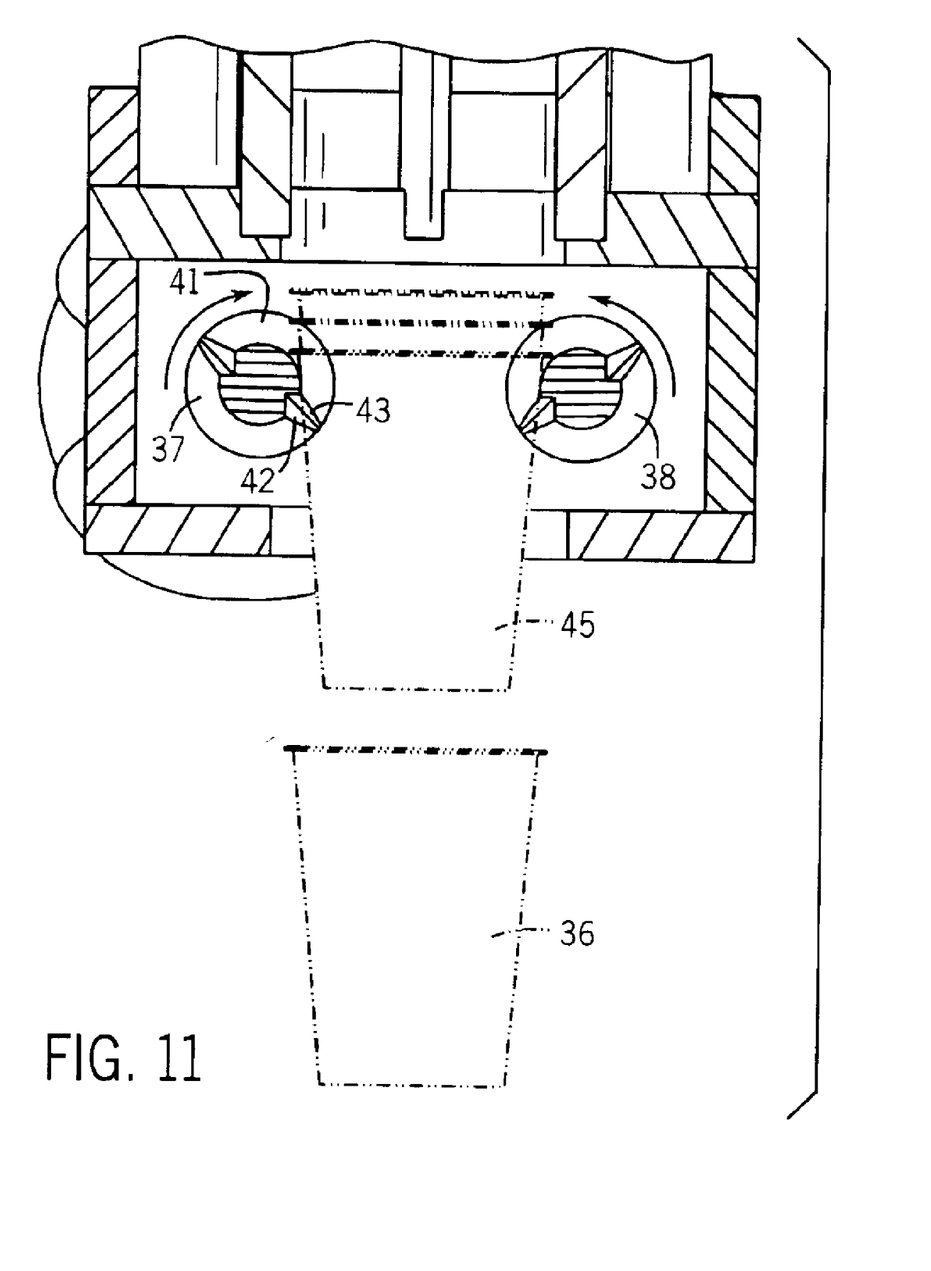

Referring now to FIGS. 9–11 there is shown another embodiment of the invention in which the drive and driven shafts 37 and 38 are operated in a reciprocating rotational manner. Although each of the shafts 37 and 38 is shown as having two diametrically opposite grooves 40, proper functioning of this embodiment requires only a single groove 40 on each shaft. In FIG. 9, a nested stack 12 of cups 13 includes a bottom cup 36 supported by its rim 39 on the profiled surface portions 41 of the two counterrotatable shafts 37 and 38. From this position, the shafts 37 and 38 are driven in the direction indicated by the arrows (which is opposite from the unidirectional rotation of the shafts in the previously described embodiment), and such reverse rotation continues until the rim 39 of the bottom cup 36 drops into the grooves 40 where the rim is supported on the leading faces 42 of the grooves. Shaft rotation is halted and reversed as shown by the double-headed arrows in FIG. 10, and rotation in the reverse direction, as shown in FIG. 11, causes the trailing faces 43 of the grooves to engage the cup rim 39 to denest and separate the cup from the remainder of the nested stack 12. The following cup 45 is held on the profiled surface portions 41, rotation is halted and reversed as indicated in FIG. 9 to denest and separate the following cup 45 in the same manner.

Figure 12:
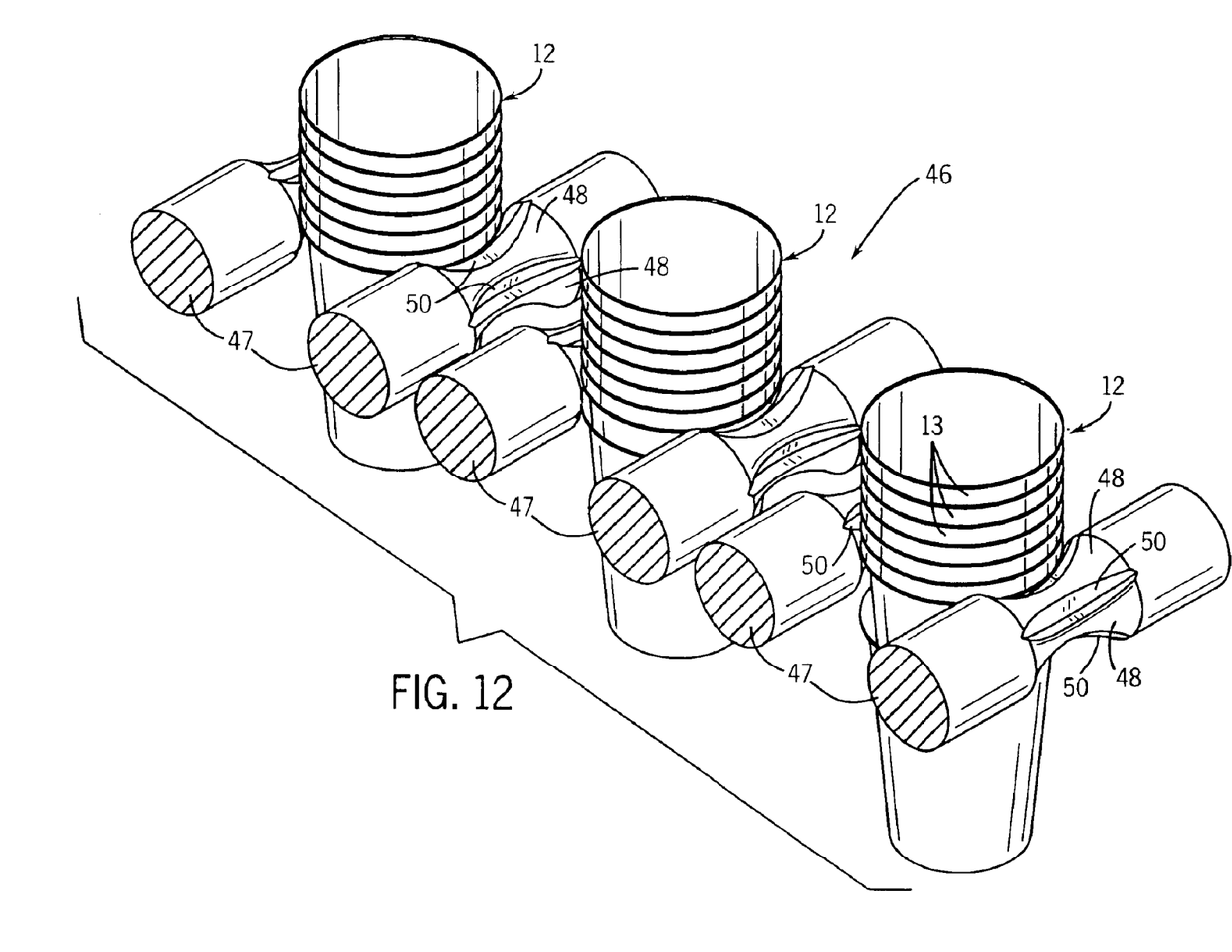
FIG. 12 is a schematic perspective view of a three-station denesting apparatus of the present invention utilizing three pairs of counterrotating shafts.

In FIG. 12, there is shown schematically a three station denesting apparatus 46 in which each station includes a pair of shafts 47, each of which is provided with profiled surface portions 48 and grooves 50, all in a manner previously described. In a modified and presently preferred arrangement shown in FIG. 13, a twelve-station apparatus 51 comprises a single drive shaft 52 and a single driven shaft 53, rotatably supported in a modular housing 57, each of which shafts is provided with four axially spaced profiled surfaces 54, each of which surfaces includes a plurality of grooves 55 separated by profiled surface portions 56. The FIG. 13 apparatus necessarily operates all twelve stations in unison, but requires substantially simplified drive and housing constructions, as compared to the FIG. 12 embodiment.

Figures 14, 15:
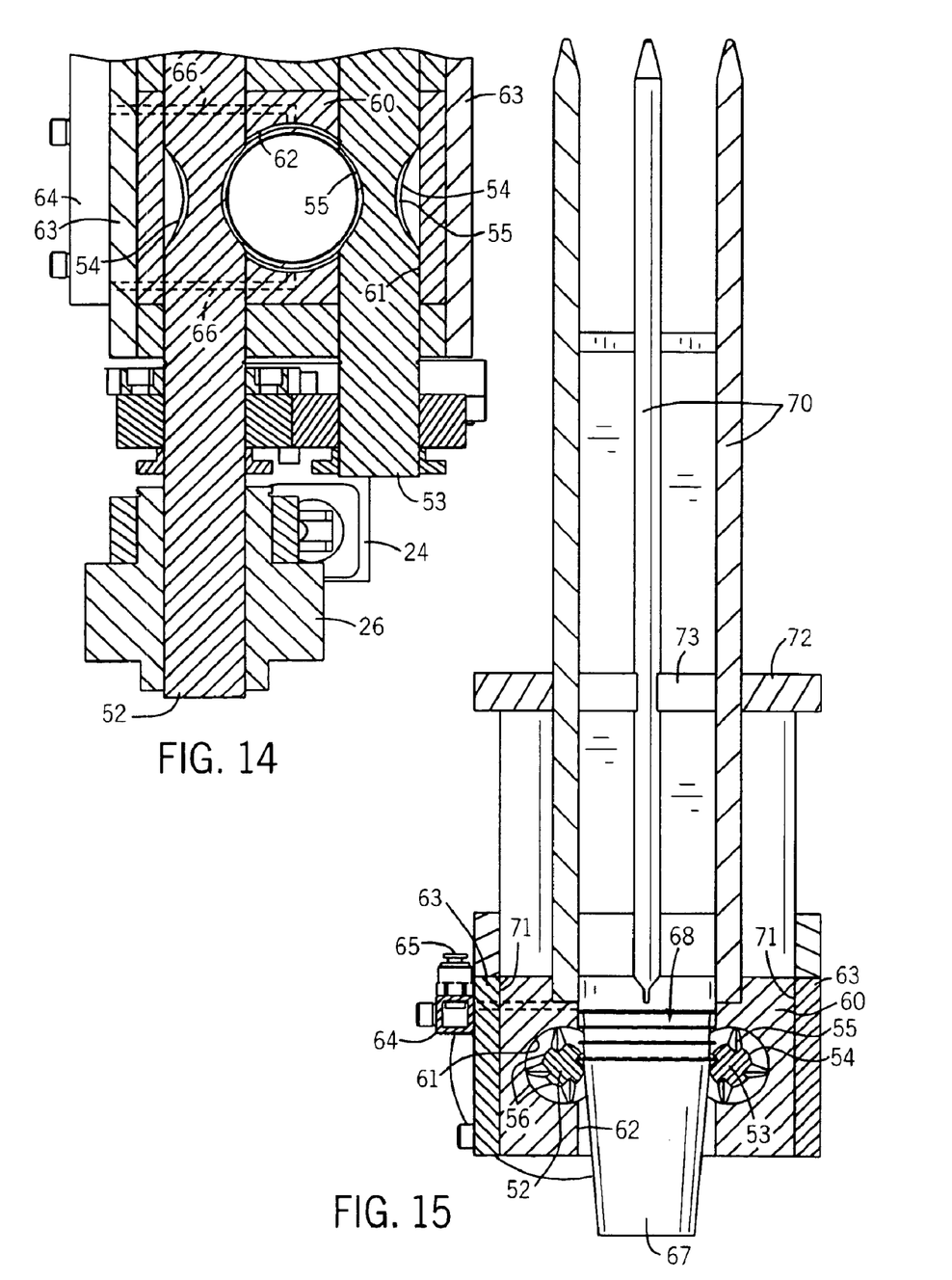
FIG. 14 is a horizontal sectional view taken on line 14—14 of FIG. 13.
FIG. 15 is a vertical sectional view taken on line 15—15 of FIG. 13.

Referring also to FIGS. 14 and 15, the multi-station housing 57 is preferably comprised of twelve modular blocks 60. In addition, each of the blocks is preferably formed of an easily machinable, tough bearing material, such as UHMW polyethylene. Each modular block 60 is provided with a pair of parallel full length bores 61 for the shafts 52 and 53 and a vertical product guiding bore 62 positioned to guide and support the stack of products between the counterrotating shafts. The product guiding bore 62 is particularly effective to provide additional lateral support for the product over the remaining approximately 180° of circumference where there is no shaft support, i.e. where the shafts 52 and 53 do not engage the stack of products. This is especially important for products that have lower structural integrity and might otherwise bulge or expand laterally into areas where there is no support, permitting products to slip past the shafts and resulting in multi-product misfeeds. The product guiding bore 62 is made slightly larger than the OD of the cup rim, e.g. about 0.050 in. (about 1.3 mm) larger for a cup with a nominal OD of 2.5 in. (about 64 mm), to permit oversize or misshaped cups to pass. Manufacture of the modular block 60 from UHMWPE (instead of steel) makes machining much easier, increases the bearing area for the shafts and inherently provides its own bearing. This eliminates the need to provide and align separate bearing blocks for each of the end faces of the block to support the shafts 52 and 53. The array of modular blocks 60 is aligned and connected together with machined steel side plates 63 which inherently align the group of modular blocks 60 for receipt of the multi-station shafts 52 and 53. The modular blocks could also be configured to be stacked together to form a two-lane, multi-station system. In this manner, each block would be provided with two pairs of bores 61 with a product guide bore 62 for each pair of shafts. The shafts would be of a multi-station configuration and the modular blocks aligned and interconnected, in the same manner previously described, to provide the two-lane, multi-station configuration. A single drive could be utilized to drive both pairs of shafts.

By utilizing a denester housing having a cylindrical product guiding bore 62, the additional lateral support the bore provides for the stack of products can actually make it possible to effectively denest the products with a single shaft of a construction of either shaft 52 or 53. In other words, the guiding bore 62 will provide good lateral support for the stack as it moves downwardly and the single shaft 52 or 53 provided with a profiled surface 54 and groove 55 will act to denest and separate the lowermost product in the stack, as previously described. However, to provide a somewhat higher degree of denesting reliability, it is preferred to use the two-shaft construction.

It has also been found desirable, when using the apparatus to denest plastic articles which tend to generate static electric charges rendering them more difficult to denest, to position air jets directed downwardly on opposite sides of the lowermost cup in the stack to provide a jet of compressed air against the rim of the bottom cup to assist in separation. The distribution of compressed air to provide the air jet assist is provided by an air manifold 64 attached to one of the side plates 63. The manifold includes a central fitting 65 to which a compressed air supply line is connected. The manifold 64 extends the full length of the twelve-station apparatus and includes two compressed air supply passages 66 for each modular block 60. As best seen in FIGS. 14 and 15, the air supply passages extend through the side plate 63 and into the block 60 above the shafts 52 and 53. At approximately the center of each block 60, the air supply passages 66 on each side of the product guide bore 62 so that they enter the open bore just above the plane of the lowermost cup 67 as it leaves the grooves 50 for separation from the stack 68 of cups above.

Figure 13:
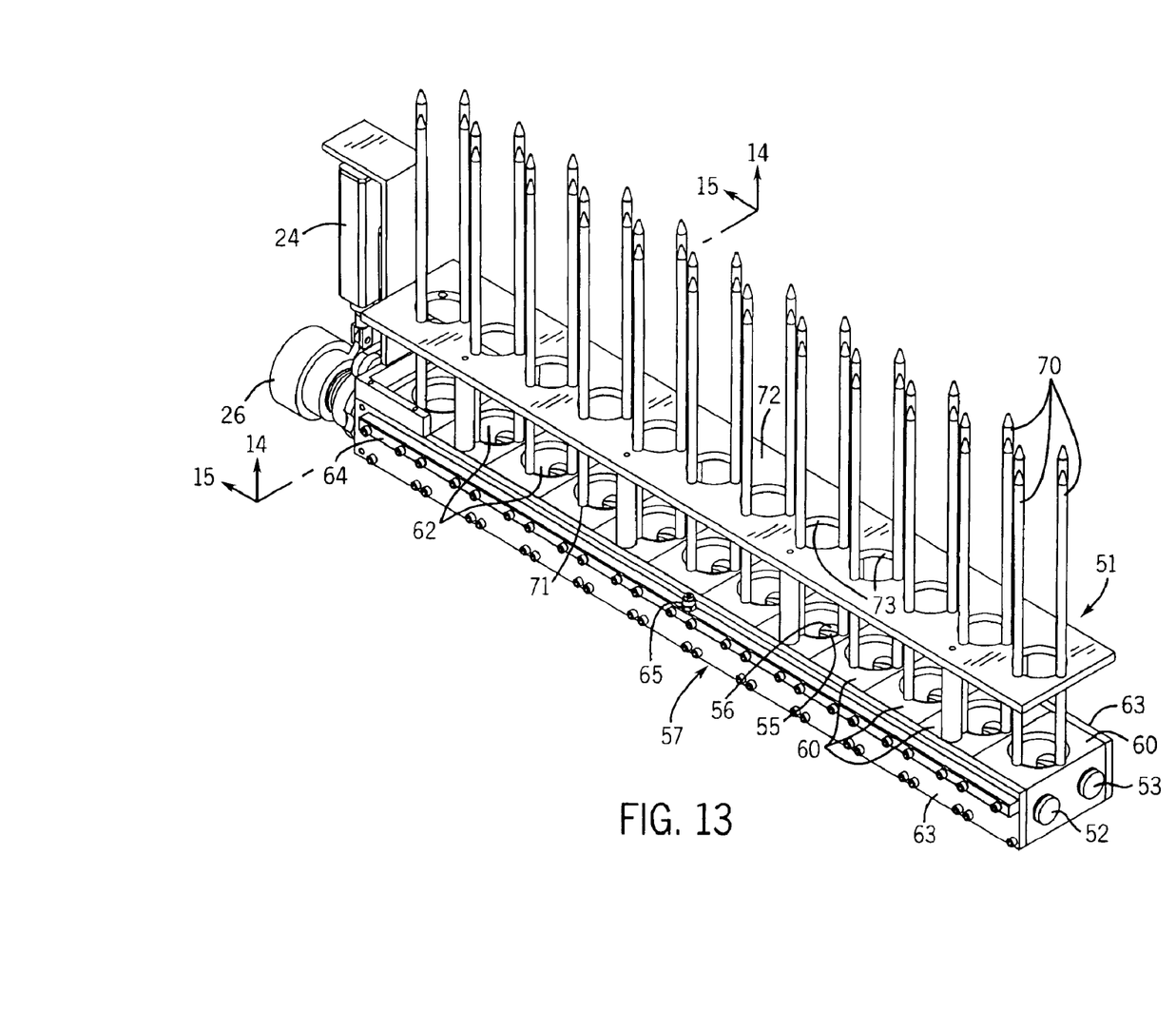
FIG. 13 is perspective view of the presently preferred embodiment of the denesting apparatus utilizing a single pair of multi-station counterrotating shafts.

As best seen in FIG. 13, each of the modular blocks 60 is provided with four vertically extending guide rods 70, similar to the guide rods 14 described with respect to the embodiment of FIGS. 1–3. Each set of guide rods 70 is received in semi-cylindrical slots 71 in the top of the block surrounding the product guiding bore 62. The guide rods extend upwardly through a support plate 72 provided with product holes 73 aligned vertically with the guiding bores 62 to provide passage for the stack of cups. The guide rods 70 pass through upper semi-cylindrical slots 74 in the peripheries of the product holes 73 to retain the rods in their operative guiding positions.

It is also contemplated that the apparatus of the present invention could be utilized to denest a stack of products having a size, shape and low structural integrity that could not be easily accommodated with a pair of denesting and separating shafts. For example, a large rectangular container which, if denested by engaging the shorter edges of the container with the denesting shafts might tend to flex and buckle along its longer edges, could be denested with two pairs of orthogonally aligned shafts, with a pair adapted to engage each of the opposite edges. The shafts could be arranged to be driven by interengaging miter or bevel gear drives in a manner to completely encompass the containers and to positively denest and separate each container from the stack.

The specially profiled denesting shafts of this invention can be adapted to handle cup-like articles of any size or shape, including oval, square, rectangular, triangular and the like by providing appropriate profile surfaces and grooves designed to provide the profiled surface contact necessary to support the stack of articles and the grooves which receive and engage the rims of the articles for denesting and separation.

Various alternatives and embodiments are contemplated as being within the scope of the following claims particularly pointing out and distinctly claiming the subject matter regarded as the invention.

We claim:

1. An apparatus for denesting articles having spaced apart circular peripheral outwardly extending rims when nested, said apparatus comprising:
    a pair of elongated laterally spaced parallel rotary shafts, each of said rotary shafts including at least one profile defining a curved surface sized and shaped to support the stack of the nested articles between said shafts by engaging the rim of the lowermost article in the stack along a continuous line of contact of at least about 90° of the rim as said rotary shafts each rotates about its longitudinal axis, and
    at least one groove formed in the profile surface and sized and shaped to receive and engage a rim of the lowermost article in the stack of nested articles and denest the lowermost article from the stack.

2. The apparatus as set forth in claim 1 including a drive for counterrotating said rotary members and maintaining the grooves in synchronization at the point of denesting.

3. An apparatus for denesting cup-shaped articles having peripheral outwardly extending rims, said rims spaced apart when said articles are in a nested stack, said apparatus comprising:
    a pair of horizontally disposed parallel laterally spaced counterrotatable shafts each having a profiled surface portion sized and shaped to receive the stack therebetween, to at least partially surround the lowermost article in the stack and to support the stack by engaging the rim of said lowermost article along a portion of the rim circumference subtending an arc of at least about 90°; and
    a groove formed in each profiled surface portion, said grooves sized and shaped to receive and engage the rim of the lowermost article in response to counter rotation of said shafts and to denest and separate said lowermost article from the stack.

4. The apparatus as set forth in claim 3 wherein said shafts are provided with a plurality of profiled surface portions and grooves axially spaced along said shafts to simultaneously support and denest a plurality of parallel stacks of articles.

5. The apparatus as set forth in claim 3 wherein said profiled surface portions make supporting line contract with the rim in a horizontal plane above a plane through the axes of the shafts.

6. The apparatus as set forth in claim 3 including a drive for counterrotating said shafts and maintaining the grooves in synchronization at the position of denesting and separation.

7. The apparatus as set forth in claim 6 wherein each shaft includes a plurality of grooves circumferentially spaced around said profiled surface, and said drive is operative to provide unidirectional rotation of said shafts.

8. The apparatus as set forth in claim 6 wherein said drive is operative to provide reciprocal rotation of said shafts.

9. The apparatus as set forth in claim 3 wherein each of said grooves has an axial length corresponding generally to the length of the surface portion and a generally V-shaped cross-section defined by a leading face and a trailing face, said leading face adapted to receive the rim of said lowermost article and said trailing face adapted to engage said rim along said arc for separation.

10. The apparatus as set forth in claim 9 wherein said leading and trailing faces intersect along a curved separating line, and a plane containing said separating line lies parallel to and offset from the axis of rotation of the shaft.

11. A method for denesting cup-shaped articles having peripheral outwardly extending rims which rims are spaced apart when the articles are in a nested stack, said method comprising the steps of:
    (1) supporting the stack between a pair of horizontally disposed parallel laterally spaced counterrotatable shafts having opposed profiled surface portions shaped to engage the rim of the lowermost article and to support the stack of articles along a portion of the rim circumference subtending an arc of at least about 90°;
    (2) providing the shafts with opposed grooves formed in said profiled surface portions; and,
    (3) counterrotating the shaft to cause the rim of the lowermost cup to enter and to be engaged by a face of said groove and to separate said cup from the stack.

12. The method as set forth in claim 11 including the steps of positioning said shafts and sizing said profiled surface portions to provide line contact with the rim of the lowermost article in a plane above and parallel to a plane containing the axes of said shafts.

13. The method as set forth in claim 12 including the step of counterrotating the shafts after separating said lowermost cup to cause profiled surface portions adjacent the grooves to engage the rim of the next cup in the stack.

14. The method as set forth in claim 13 including the steps of counterrotating the shafts in the direction of separation, and providing profiled surface portions rotationally upstream of said grooves to engage the rim of said next cup.

15. The method as set forth in claim 13 including the steps of counterrotating the shafts in the direction opposite the direction of separation.

16. The method as set forth in claim 11 including the steps of providing said groove with axial lengths corresponding to the length of the profiled surface portions, and engaging the rim of the article with said face along said arc of at least about 90°.

17. An apparatus for denesting cup-shaped articles having peripheral outwardly extending rims, said rims spaced apart when said articles are in a nested stack, said apparatus comprising:

a first rotatable shaft having a profiled surface portion sized and shaped to receive and partially surround the lowermost article in the stack and to support the stack by engaging the rim of said lowermost article along a continuous line of contact of at least about 90° of the rim periphery; and a groove formed in said profiled surface portion, said groove sized and shaped to receive and engage the rim of the lowermost article in response to rotation of said first shaft and to denest and separate said lowermost article from the stack.

18. The apparatus as set forth in claim 17 including a second rotatable shaft laterally spaced from said first shaft and having a second profiled surface portion sized and shaped to receive and partially surround the lowermost article in the stack and to cooperate with said first shaft to support the stack by engaging the rim of said lowermost article along a continuous line of contact of at least about 90° of the rim periphery.

19. The apparatus as set for the in claim 18 including a second groove formed in said second surface portion sized and shaped to receive and engage the rim of said lowermost article and to cooperate with said first groove to engage the rim of said lowermost article in response to rotation of said second shaft to denest and separate said lowermost article from the stack.

20. The apparatus as set forth in claim 17 including a bearing and guide block including a shaft bore for receiving and rotationally supporting said first shaft; and a product guiding bore extending perpendicular to the axis of said first shaft, having a diameter slightly larger than the maximum diameter of the articles, and positioned to provide lateral support for the stack of articles along the peripheries thereof unsupported by the profiled surface portion.

* * * * *